United States Patent
Tucker et al.

(10) Patent No.: US 11,177,514 B2
(45) Date of Patent: Nov. 16, 2021

(54) BATTERY SYSTEM WITH MANAGEMENT MODULE

(71) Applicant: XING POWER INC., Mahe (SC)

(72) Inventors: Kareem Azizi Tucker, Taipei (TW); Yu-Chung Lin, Taipei (TW)

(73) Assignee: XING POWER INC., Victoria (SC)

( * ) Notice: Subject to any disclaimer, the term of this patent is extended or adjusted under 35 U.S.C. 154(b) by 206 days.

(21) Appl. No.: 16/385,898

(22) Filed: Apr. 16, 2019

(65) Prior Publication Data

US 2020/0335830 A1    Oct. 22, 2020

(51) Int. Cl.
| | |
|---|---|
| *H01M 10/42* | (2006.01) |
| *H01M 10/48* | (2006.01) |
| *H01M 10/6567* | (2014.01) |
| *H01M 2/10* | (2006.01) |
| *H01M 50/20* | (2021.01) |

(52) U.S. Cl.
CPC ....... *H01M 10/425* (2013.01); *H01M 10/482* (2013.01); *H01M 10/6567* (2015.04); *H01M 50/20* (2021.01); *H01M 2010/4271* (2013.01); *H01M 2220/20* (2013.01)

(58) Field of Classification Search
CPC ............. H01M 10/625; H01M 10/654; H01M 10/6567; H01M 10/6568; H01M 10/6569; H01M 10/635; H01M 2220/20
See application file for complete search history.

(56) References Cited

U.S. PATENT DOCUMENTS

| | | | | |
|---|---|---|---|---|
| 2009/0205432 | A1* | 8/2009 | Keilman | G01L 9/0073 |
| | | | | 73/718 |
| 2010/0104927 | A1* | 4/2010 | Albright | B60L 58/26 |
| | | | | 429/50 |
| 2014/0329121 | A1* | 11/2014 | Nishihara | H01M 10/4257 |
| | | | | 429/90 |
| 2017/0279172 | A1* | 9/2017 | Tucker | H01M 10/6568 |
| 2017/0358833 | A1* | 12/2017 | Jalilevand | B60H 1/00385 |

* cited by examiner

*Primary Examiner* — Ula C Ruddock
*Assistant Examiner* — Matthew W Van Oudenaren
(74) *Attorney, Agent, or Firm* — Hamre, Schumann, Mueller & Larson, P.C.

(57) ABSTRACT

A battery system for an electric vehicle includes at least one battery module and a management module. The battery module includes a plurality of battery cells, and an outer casing which defines therein an accommodation space for accommodation of the battery cells, and which is configured to permit a thermal management fluid to flow through the accommodation space to thereby provide thermal management to the battery cells. The management module includes at least one sensing unit and is coupled to the battery module to permit the sensing unit to be submerged in the thermal management fluid for collecting information of the battery cells and the thermal management fluid.

8 Claims, 4 Drawing Sheets

BATTERY SYSTEM WITH MANAGEMENT MODULE

FIELD

The disclosure relates to a battery system for an electric vehicle, more particularly to a battery system with at least one sensing unit which is submerged in a thermal management fluid to collect information of battery cells and the thermal management fluid.

BACKGROUND

Chinese utility model patent application no. CE 207542358 U discloses a conventional liquid cooling battery module for an electric vehicle. The liquid cooling battery module includes battery modules, heat dissipation fin members which are disposed to alternate the battery modules, and a liquid-cooling board on which the heat dissipation fin members are mounted. Each of the battery modules includes batteries and busbars which are connected to electrodes of the batteries. The busbars of each of battery modules are in contact with the corresponding heat dissipation fin members through thermally conductive and electrically insulative layers.

U.S. Pat. No. 7,414,845 B2 discloses a conventional circuit board assembly, for example, a computer motherboard, for use in a liquid submersion cooled electronic device, for example, a computer. The circuit board assembly is configured to facilitate movement of the cooling liquid when the circuit board is submerged in the cooling liquid, thereby improving the heat transfer from heat-generating components on the circuit board. For a computer, a plurality of heat-generating components are mounted on the motherboard, including a plurality of processors, a plurality of memory cards, a plurality of graphics cards, and a plurality of power supplies. A pump for the cooling liquid can also be mounted on the motherboard. Please note that the heat-generating components are immersed in the cooling liquid for cooling purpose only.

SUMMARY

Therefore, an object of the disclosure is to provide a battery system for an electric vehicle, which has at least one sensing unit submerged in a thermal management fluid to collect information of battery cells and the thermal management fluid.

According to the disclosure, the battery system includes at least one battery module and a management module. The battery module includes a plurality of battery cells, and an outer casing which defines therein an accommodation space for accommodation of the battery cells, and which is configured to permit a thermal management fluid to flow through the accommodation space to thereby provide thermal management to the battery cells. The management module includes at least one sensing unit and is coupled to the battery module to permit the sensing unit to be submerged in the thermal management fluid for collecting information of the battery cells and the thermal management fluid.

BRIEF DESCRIPTION OF THE DRAWINGS

Other features and advantages of the disclosure will become apparent in the following detailed description of the embodiment (s) with reference to the accompanying drawings, in which.

DETAILED DESCRIPTION

Figure 1:
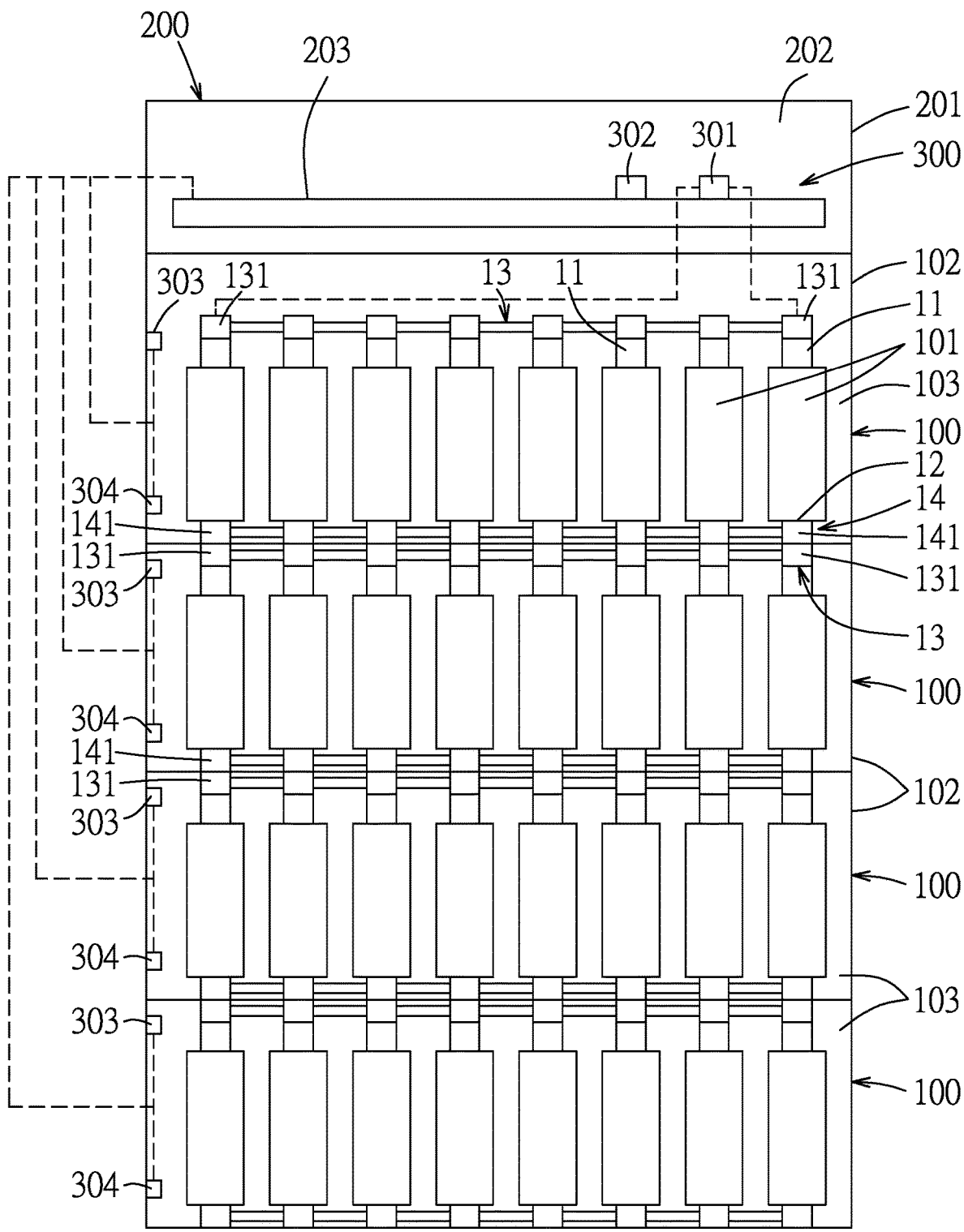
FIG. 1 is a schematic view illustrating a battery system according to a first embodiment of the disclosure.

Before the disclosure is described in greater detail, it should be noted that where considered appropriate, reference numerals have been repeated among the figures to indicate corresponding or analogous elements, which may optionally have similar characteristics.

It should be noted that the drawings, which are for illustrative purposes only, are not drawn in every detail, and are not intended to represent the actual sizes or actual relative sizes of the components of a battery system.

Referring to FIG. 1, a battery system for an electric vehicle (not shown) according to a first embodiment of the disclosure is shown to include at least one battery module 100 and a management module 200.

The battery module 100 includes a plurality of battery cells 101, and an outer casing 102. The outer casing 102 defines therein an accommodation space 103 for accommodation of the battery cells 101, and is configured to permit a thermal management fluid to flow through the accommodation space 103 to thereby provide thermal management to the battery cells 101. Each of the battery cells 101 has a first terminal 11 and a second terminal 12 opposite to the first terminal 11. The thermal management fluid may be, but is not limited to, mineral oil, silicone oil, ester-based oil, or engineered fluid, etc. In an embodiment, the thermal management fluid is used for cooling the battery cells 101, and is engineered fluid.

In an embodiment shown in FIG. 1, the battery module 100 further includes a first connection bar unit 13 which is configured to electrically connect the first terminals 11 of the battery cells 101 together, and a second connection bar unit 14 which is configured to electrically connect the second terminals 12 of the battery cells 101 together. The first connection bar unit 13 includes a plurality of first connection bars 131, and the second connection bar unit 14 includes a plurality of second connection bars 141. The details of the first and second connection bar units 13, 14 may be similar to those disclosed in the inventor's previous patent applications, such as US 2017/0279172 A1, EP 3223338 A1, etc.

In an embodiment shown in FIG. 1, the battery system includes a plurality of the battery modules 100. The battery modules 100 are stacked on each other to permit the battery cells 101 of the battery modules 100 to be electrically connected to each other through the first and second connection bar units 13, 14, and to permit the thermal management fluid to flow through the accommodation spaces 103 of the outer casings 102 of the battery modules 100 in sequence. The battery modules 100 may be stacked like interlocking building blocks (e.g., LEGO building blocks) to form a battery pack.

The management module 200 includes at least one sensing unit 300 and is coupled to the battery module (s) 100 to permit the sensing unit 300 to be submerged in the thermal management fluid for collecting information of the battery cells 101 and the thermal management cooling fluid.

Figure 2:
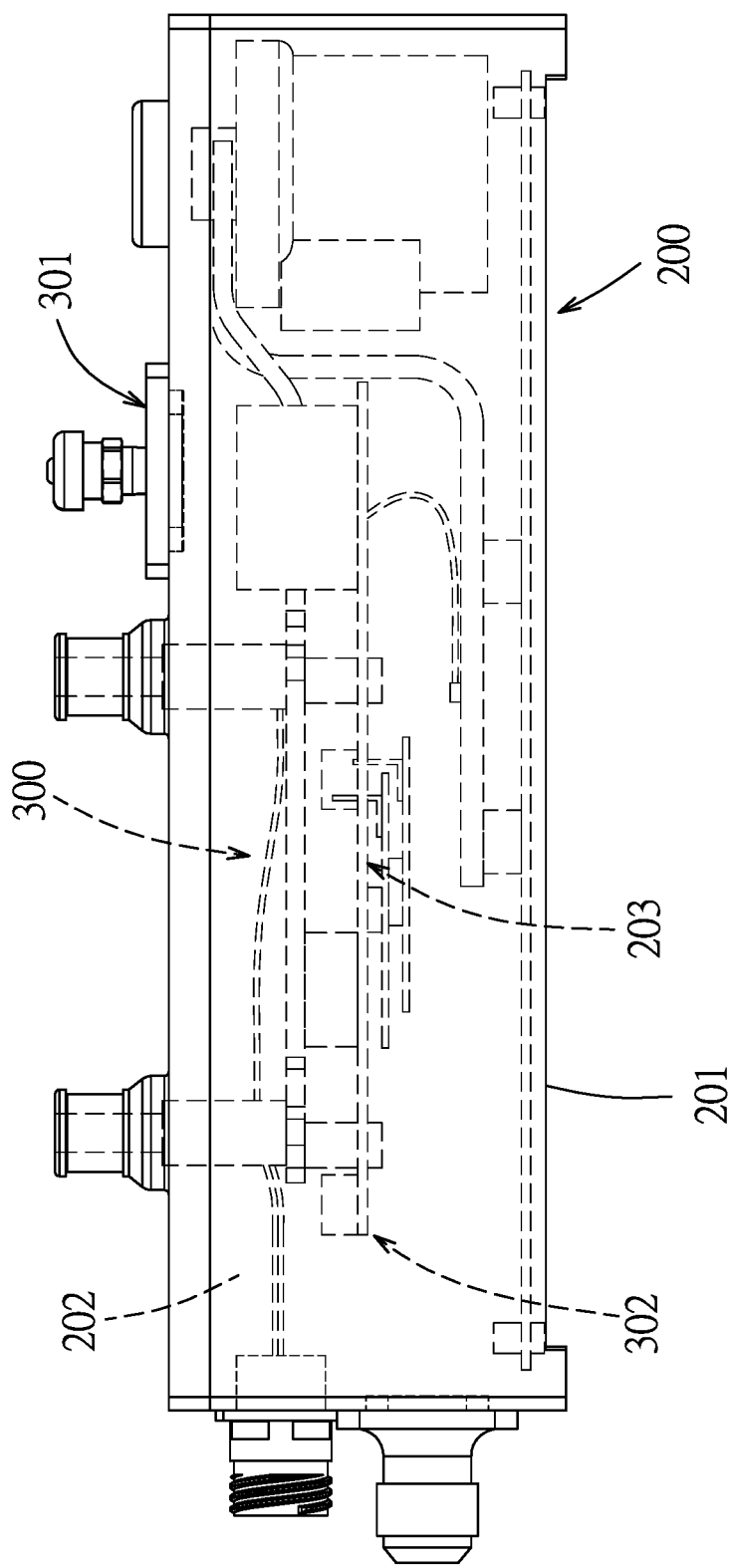
FIG. 2 is a schematic view illustrating a management module of the battery system in the first embodiment.

In an embodiment shown in FIGS. 1 and 2, the management module 200 further includes a housing 201 and a management circuit board 203.

The housing 201 defines an inner chamber 202 therein, and is coupled to a leading or trailing one of the battery modules 100 to permit the thermal management fluid to flow through the inner chamber 202.

In an embodiment shown in FIG. 1, the housing 201 is coupled to the outer casing 102 of the leading one of the battery modules 100 to permit the thermal management fluid in the inner chamber 202 to be introduced into the accommodation space 103 of the leading one of the battery modules 100. The management circuit board 203 is mounted inside the inner chamber 202 to be submerged in the thermal management fluid, and functions to manage the information received from the sensing unit 300.

In an embodiment shown in FIGS. 1 and 2, a single sensing unit 300 is provided, and includes a connectivity sensor 301, a flow meter 302, a plurality of pressure sensors 303, and a plurality of temperature sensors 304.

The connectivity sensor 301 is mounted on the management circuit board 203, and which is electrically connected to two of the first connection bars 131 of the leading one of the battery modules 100 for detecting an electrical resistance between the two of the first connection bars 13. The connectivity sensor 301 is provided for checking of pollution in the thermal management fluid or change in chemistry in the thermal management fluid. The electrical connections among the connectivity sensor 301 and the two of the first connection bars 131 are shown by dotted lines in FIG. 1.

The flow meter 302 is mounted on the management circuit board 203 for detecting a flow rate of the thermal management fluid, and is used for ensuring that a pump (not shown) for the thermal management fluid is functioning properly.

The pressure sensors 303 are disposed respectively in the accommodation spaces 103 of the battery modules 100 for detecting liquid pressures of the thermal management fluid inside the accommodation spaces 103, respectively, and are electrically connected to the management circuit board 203 to permit data communication between the pressure sensors 303 and the management circuit board 203. In an embodiment, the pressure sensors 303 are atmospheric MEMS sensors.

The temperature sensors 304 are disposed respectively in the accommodation spaces 103 for detecting temperatures of the thermal management fluid inside the accommodation spaces 103, respectively, and are electrically connected to the management circuit board 203 to permit data communication between the temperature sensors 304 and the management circuit board 203.

Please note that the sensors 301, 302, 303, 304 submerged in the thermal management fluid are for understanding behavior and condition of the battery and the thermal management fluid, not for cooling the sensors 301, 302, 303, 304, and such arrangement are useful for improving safety of the battery pack.

The electrical connections among the battery cells 101 and sensors may heat up easily, the heat dissipating in the form of waste heat. If the electrical connections include a fuse element, the temperature change would adversely affect the fusing. The electrical connections being at a relatively high temperature may also adversely affect the efficiency of the battery modules. Cooling the electrical connections by submerging it in the thermal management fluid improves efficiency of the battery modules and reduces power wastage. Please note that the battery module differs from the conventional ones because the electrical connections are completely submerged in the thermal management fluid so as to facilitate the electrical connections to be cooled more efficiently.

Figure 3:
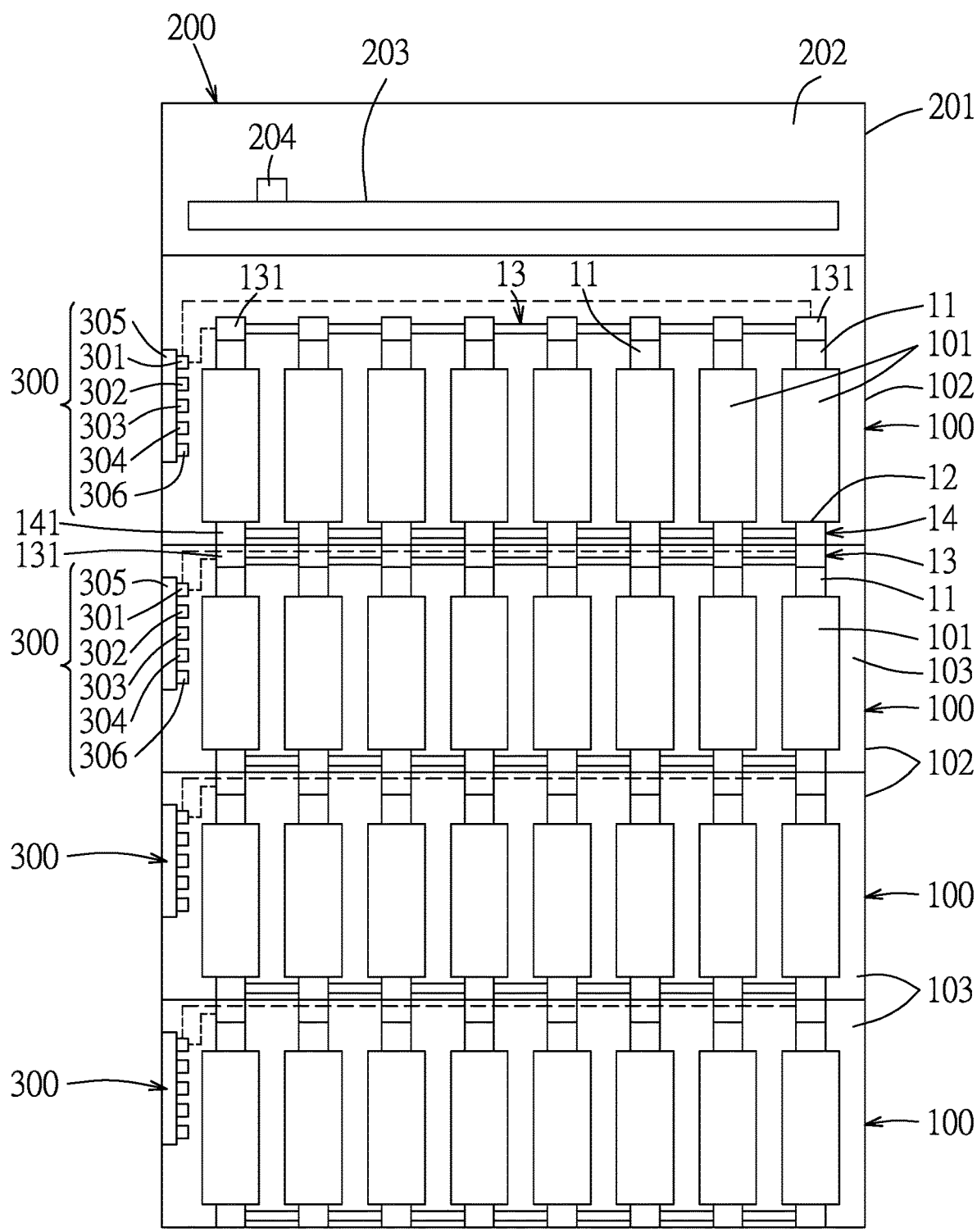
FIG. 3 is a schematic view illustrating a battery system according to a second embodiment of the disclosure.

FIG. 3 shows a battery system for an electric vehicle according to a second embodiment of the disclosure. The second embodiment is similar to the first embodiment except that in the second embodiment, the management module 200 includes a plurality of the sensing units 300 disposed in the accommodation spaces 103 of the battery modules 100, respectively. Each of the sensing units 300 includes a printed circuit board 305, a connectivity sensor 301, a flow meter 302, a pressure sensor 303, and a temperature sensor 304.

The printed circuit board 305 is disposed in the respective accommodation space 103.

The connectivity sensor 301 is mounted on the printed circuit board 305, and is electrically connected to two of the first connection bars 13 of the respective battery module 100 for detecting an electrical resistance between the two of the first connection bars 13. The electrical connections among the connectivity sensor 301 and the two of the first connection bars 131 are shown by dotted lines in FIG. 3.

The flow meter 302 is mounted on the printed circuit board 305 for detecting a flow rate of the thermal management fluid inside the respective accommodation space 103.

The pressure sensor 303 is mounted on the printed circuit board 305 for detecting liquid pressure of the thermal management fluid inside the respective accommodation space 103. In an embodiment, the pressure sensors 303 are atmospheric MEMS sensors.

The temperature sensor 304 is mounted on the printed circuit board 305 for detecting temperature of the thermal management fluid inside the respective accommodation space 103.

In an embodiment shown in FIG. 3, each of the sensing units 300 further includes a wireless transmitter 306 which is mounted on the printed circuit board 305 for transmitting data collected by the connectivity sensor 301, the flow meter 302, the pressure sensor 303, and the temperature sensor 304.

Figure 4:
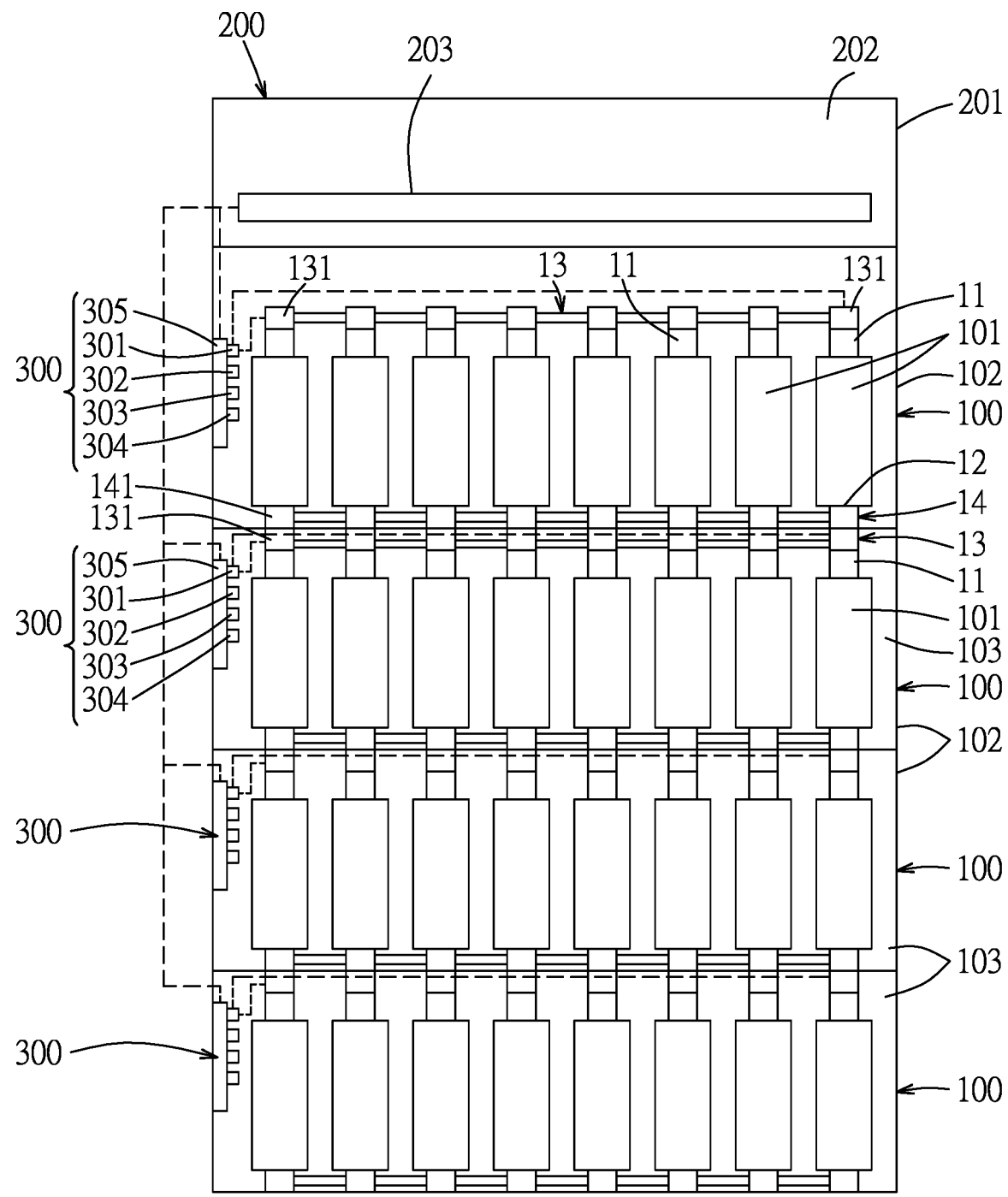
FIG. 4 is a schematic view illustrating a battery system according to a third embodiment of the disclosure.

In addition, the management module 200 further includes a wireless receptor 204 mounted on the management circuit board 203 for receiving the data from the wireless transmitters 306 of the sensing units 300. FIG. 4 shows a battery system for an electric vehicle according to a third embodiment of the disclosure. The third embodiment is similar to the second embodiment except that in the third embodiment, the wireless transmitter 306 and the wireless receptor 204 are not included, and a circuit on the printed circuit board 305 is electrically connected to a circuit on the management circuit board 203 so as to permit data collected by the connectivity sensor 301, the flow meter 302, the pressure sensor 303, and the temperature sensor 304 to be transmitted to the management circuit board 203.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment (s), it is understood that this disclosure is not limited to the disclosed embodiments) but is intended to cover various arrangements included within the spirit and scope of the broadest interpretation so as to encompass all such modifications and equivalent arrangements.

What is claimed is:

1. A battery system for an electric vehicle, comprising:
at least one battery module including a plurality of battery cells, and an outer casing which defines therein an accommodation space for accommodation of said battery cells, and which is configured to permit a thermal management liquid to flow through said accommodation space to thereby provide thermal management to said battery cells;
a management module which includes at least one sensing unit and which is coupled to said battery module to permit said sensing unit to be submerged in the thermal management liquid for collecting information of said battery cells and the thermal management liquid,
wherein each of said battery cells has a first terminal and a second terminal, and said battery module further includes a first connection bar unit which is configured to electrically connect said first terminals of said battery cells together, and a second connection bar unit which is configured to electrically connect said second terminals of said battery cells together; and
wherein said battery system comprises a plurality of said battery modules, said battery modules being stacked on each other to permit said battery cells of said battery modules to be electrically connected to each other through said first and second connection bar units, and to permit the thermal management liquid to flow through said accommodation spaces of said outer casings of said battery modules in sequence, said management module further including
a housing defining an inner chamber therein, and coupled to a leading or trailing one of said battery modules to permit the thermal management liquid to flow through said inner chamber, and
a management circuit board which is mounted inside said inner chamber to be submerged in the thermal management liquid, and which functions to manage the information received from said sensing unit.

2. The battery system according to claim 1, wherein said housing is coupled to said outer casing of the leading one of said battery modules to permit the thermal management liquid in said inner chamber to be introduced into said accommodation space of the leading one of said battery modules.

3. The battery system according to claim 2, wherein said first connection bar unit has a plurality of first connection bars, and said sensing unit includes
a connectivity sensor which is mounted on said management circuit board, and which is electrically connected to two of said first connection bars of the leading one of said battery modules for detecting an electrical resistance between said two of said first connection bars, a flow meter mounted on said management circuit board for detecting a flow rate of the thermal management liquid,
a plurality of pressure sensors which are disposed respectively in said accommodation spaces of said battery modules for detecting liquid pressures of the thermal management liquid inside said accommodation spaces, respectively, and which are electrically connected to said management circuit board to permit data communication between said pressure sensors and said management circuit board; and
a plurality of temperature sensors which are disposed respectively in said accommodation spaces for detecting temperatures of the thermal management liquid inside said accommodation spaces, respectively, and which are electrically connected to said management circuit board to permit data communication between said temperature sensors and said management circuit board.

4. The battery system according to claim 3, wherein said pressure sensors are atmospheric MEMS sensors.

5. A battery system for an electric vehicle, comprising:
at least one battery module including a plurality of battery cells, and an outer casing which defines therein an accommodation space for accommodation of said battery cells, and which is configured to permit a thermal management liquid to flow through said accommodation space to thereby provide thermal management to said battery cells;
a management module which includes at least one sensing unit and which is coupled to said battery module to permit said sensing unit to be submerged in the thermal management liquid for collecting information of said battery cells and the thermal management liquid,
wherein each of said battery cells has a first terminal and a second terminal, and said battery module further includes a first connection bar unit which is configured to electrically connect said first terminals of said battery cells together, and a second connection bar unit which is configured to electrically connect said second terminals of said battery cells together;
wherein said battery system comprises a plurality of said battery modules, said battery modules being stacked on each other to permit said battery cells of said battery modules to be electrically connected to each other through said first and second connection bar units, and to permit the thermal management liquid to flow through said accommodation spaces of said outer casings of said battery modules in sequence, said management module further including
a housing defining an inner chamber therein, and coupled to a leading or trailing one of said battery modules to permit the thermal management liquid to flow through said inner chamber, and
a management circuit board which is mounted inside said inner chamber to be submerged in the thermal management liquid, and which functions to manage the information received from said sensing unit;
wherein said housing is coupled to said outer casing of the leading one of said battery modules to permit the thermal management liquid in said inner chamber to be introduced into said accommodation space of the leading one of said battery modules; and
wherein said first connection bar unit has a plurality of first connection bars, and said management module includes a plurality of said sensing units disposed in said accommodation spaces of said battery modules, respectively, each of said sensing units including a printed circuit board disposed in said respective accommodation space, a connectivity sensor which is mounted on said printed circuit board, and which is electrically connected to two of said first connection bars of said respective battery module for detecting an electrical resistance between said two of said first connection bars, a flow meter mounted on said printed circuit board for detecting a flow rate of the thermal management liquid inside said respective accommodation space, a pressure sensor mounted on said printed circuit board for detecting liquid pressure of the thermal management fluid liquid inside said respective accommodation space, and a temperature sensor mounted on said printed circuit board for detecting temperature of the thermal management liquid inside said respective accommodation space.

6. The battery system according to claim 5, wherein each of said sensing units further includes a wireless transmitter which is mounted on said printed circuit board for transmitting data collected by said connectivity sensor, said flow meter, said pressure sensor, and said temperature sensor; and said management module further includes a wireless receptor mounted on said management circuit board for receiving the data from said wireless transmitters of said sensing units.

7. The battery system according to claim 5, wherein said pressure sensor is an atmospheric MEMS sensor.

8. The battery system according to claim 5, wherein a circuit on said printed circuit board is electrically connected to a circuit on said management circuit board so as to permit data collected by said connectivity sensor, said flow meter, said pressure sensor, and said temperature sensor to be transmitted to said management circuit board.

* * * * *